United States Patent [19]

Waldman

[11] Patent Number: 4,626,630
[45] Date of Patent: Dec. 2, 1986

[54] TELEPHONE CALL FORWARDING DEVICE

[75] Inventor: Herbert H. Waldman, Brooklyn, N.Y.

[73] Assignee: Louis Orenbuch, Boston, Mass.

[21] Appl. No.: 684,021

[22] Filed: Dec. 20, 1984

[51] Int. Cl.[4] .............................................. H04M 3/54
[52] U.S. Cl. ................................... 379/199; 379/210; 379/211
[58] Field of Search ........... 179/18 BE, 84 R, 84 VF, 179/81 R, 6.11, 6.02, 18 B, 18 BD

[56] References Cited

U.S. PATENT DOCUMENTS 4,086,438 4/1978 Kahn et al. ...................... 179/18 BE
4,475,009 10/1984 Rais et al. .................. 179/18 BE X Primary Examiner—James L. Dwyer
Attorney, Agent, or Firm—Wolf, Greenfield & Sacks

[57] ABSTRACT

A telephone call forwarding device enables call forwarding instructions to be given over the telephone for which call forwarding service has been procured from a second telephone line connected to the device. A ring signal detector, in response to a preselected number of rings on the second phone line, causes the second phone line to be seized for a short cycle period in which an authorization signal can be received by the device. If an authorization signal is received during that period, a long cycle timer is activated which maintains seizure of the second phone line for a long cycle period. During that long cycle period, a repeat timer repetitively and alternatingly causes the procured service phone line to be seized for an interval in which call forwarding instructions can be relayed from the second phone line and to release the procured service phone line for an interval whose duration enables a new dial tone to be obtained on the procured service phone line at the beginning of the next interval for giving call forwarding instructions.

6 Claims, 2 Drawing Figures

TELEPHONE CALL FORWARDING DEVICE

DISCLOSURE DOCUMENT CITATION

The invention here disclosed is the subject matter of Disclosure Document No. 113,537 which was filed on Dec. 21, 1982 in the United States Patent and Trademark Office.

FIELD OF INVENTION

This invention relates in general to telephone systems and more particularly pertains to apparatus for use with the call forwarding service now provided by many telephone operating companies to their subscribers.

TELEPHONE CALL FORWARDING

Call forwarding is a service in which telephone calls placed to a subscriber's telephone number are diverted at the central station to another telephone number. The advantage of call forwarding is that incoming calls can be diverted to any other telephone number simply by instructing the central office to divert the calls to a designated telephone number. The instructions must, however, be given over the subscriber's telephone line for which the call forwarding service is provided. That is, call forwarding service is provided only for calls made to the subscriber's telephone line for which that service has been procured and all instructions to the central station for diverting those calls to another telephone number must be made over that telephone line. For ease of reference, the subscriber's telephone line for which call forwarding service is provided is denominated "the procured service phone line".

To activate call forwarding in a typical system, the subscriber's telephone for which call forwarding service is provided is taken off-hook. The call forwarding service is applicable to both pulse and tone signaling telephones. Assuming the subscriber's telephone is of the tone signaling type having a twelve button keypad, the number "72" and the # sign are dialed. Upon receipt of the dial tone, the telephone number to which the calls are to be forwarded is dialed and ringing is heard. When the phone is answered, call forwarding to that telephone number is established. It is customary to inform the person answering the phone that calls will be forwarded to that telephone. In the event the phone to which calls are to be forwarded is busy or the ring is not answered, call forwarding can be established by hanging up the subscriber's phone and within 2 minutes again dialing "72" and #, obtaining the dial tone, dialing the number to which calls are to be forwarded, and listening for two beep tones. Receipt of the two beep tones indicates that call forwarding has been established.

To cancel call forwarding, the subscriber's telephone is taken off-hook, "73" and the # sign are dialed, and the receipt of two beep tones is awaited. Receipt of the two beep tones signifies that call forwarding has been cancelled.

In some systems the # signal is used only to speed up service and in those systems the # signal need not be employed.

CALL FORWARDING LIMITATION

The limitation on call forwarding which requires all forwarding and cancelling instructions to be given over the subscriber's procured service phone line provides a measure of security because only persons having access to that procured service phone line can alter or cancel the call forwarding instructions. However, that limitation is often inconvenient because call forwarding instructions heretofore could not be easily changed from a station remote from the subscriber's procured service telephone, as for example, when the subscriber moves from one remote location to another.

OBJECTS OF THE INVENTION

The principal objective of the invention is to provide a device that enables call forwarding instructions to be given from any telephone in the system or in any connecting system.

Another objective of the invention is to provide a device that enables call forwarding instructions to be given from any connecting telephone while insuring that instructions will be accepted only from authorized persons.

A further objective of the invention is to provide a device that permits repetition of the call forwarding instructions to be made within one telephone call from the remote station to allow for the eventuality that the phone to which calls are to be forwarded is busy or the ring is not answered, thus avoiding the need to place a second call from the remote station to complete the call forwarding program.

Another objective of the invention is to provide a device that permits call forwarding instructions to be given over the procured service phone line from a remote station and enables the instructions to be reentered, corrected, changed, or cancelled during a predetermined period without requiring another call to be made from the remote station.

Another objective of the invention is to provide a device which enables call forwarding instructions to be given from any remote telephone station only after the receipt by the device of a selected number of telephone rings whereby actuation of the device can be averted by answering the call before the selected number of rings occur.

THE DRAWINGS

FIG. 1 diagramatically shows the scheme of the preferred embodiment of the invention.

FIG. 2 is a diagram showing circuits employed in the preferred embodiment of the invention.

DESCRIPTION OF THE PREFERRED EMBODIMENT

Figure 1:
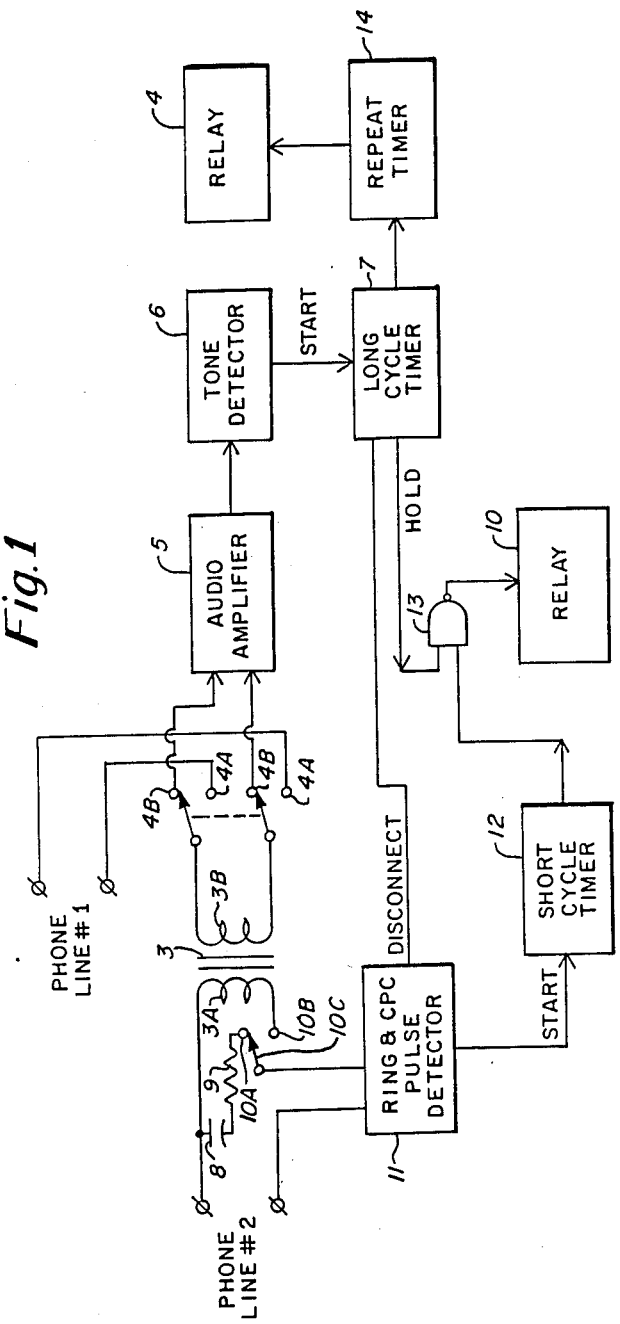

The scheme of the invention is diagrammatically shown in FIG. 1. For ease of exposition, the subscriber's "procured service" telephone line for which the telephone company provides call forwarding service is designated "phone line #1". Call forwarding instructions to the central office must be transmitted over phone line #1 to be effective. Phone line #2 is another phone line which is coupled to phone line #1 in a manner enabling audio signals to be transmitted from one line to the other. For ease of reference, phone line #2 is denominated "the dedicated phone line". In the FIG. 1 diagram, the two phone lines are coupled by an audio transformer 3 whose windings 3A and 3B preferably have a 1 to 1 turns ratio.

A double pole, double throw relay 4 has one set of contacts 4A connected to phone line #1 and its other set of contacts 4B connected to the input of an audio amplifier 5 whereby that relay causes the audio transformer to be connected either to the audio amplifier or to the phone line #1. In the initial state of the remote controller, relay 4 connects the audio transformer to the input of audio amplifier 5. The output of the audio amplifier is fed to a tone detector 6 which is arranged, upon receiving a tone signal of the proper frequency, to emit a start signal to a timing device 7.

Phone line #2 is connected by capacitor 8, series resistor 9, contact 10A, and armature 10C to a ring detector 11. Contact 10A, contact 10B and armature 10C are components of relay 10. Upon receipt of a ring signal from phone line #2, the ring detector emits a signal that causes short cycle timer 23 to start its timing cycle. That timer may, for example, have a 15 second cycle in which it continously emits a signal to NAND gate 13 that causes relay 20 to be energized. Energization of that relay causes its armature 10C to move from contact 10A to contact 10B whereupon winding 3A of the transformer is placed across phone line #2 and establishes a DC path whose impedance is such as to cause that phone line to be seized.

If, in the 15 second period, a proper identifying tone is received by tone detector 6, that tone detector emits a signal which starts the timing cycle of long cycle timer 7. Preferably, that timing cycle is about 140 seconds in duration but can be as short as 50 seconds. The duration of the timing cycle of the long cycle timer can be arbitrarily chosen but should be at least long enough for the repeat timer to go through two of its timing cycles. The long cycle timer 7, for the duration of its timing cycle, emits a signal to NAND gate 13 that holds relay 10 in its energized state so that phone line #2 remains seized. Where a proper identifying tone is not received by the tone detector in the 15 second period, short cycle timer 12 causes relay 10 to be deactivated at the end of that period. Relay armature 10C thereupon returns to contact 10A, releasing phone line #2.

Where a proper identifying tone is received by tone detector 6 in the 15 second period, long cycle timer 7 is activated and emits a signal to repeat timer 14 which causes the repeat timer to energize relay 4. Relay 4 thereupon throws its armature to connect procured service phone line #1 to audio transformer 3. The repeat timer keeps relay 4 energized for an interval sufficient to receive a dial tone from line #1, allow call forwarding instructions to be transmitted over the procured service phone line to the central station, and allow the phone to be answered at the location where calls are to be forwarded. An interval of twenty-two seconds has been found to be adequate. At the end of that interval, the repeat timer causes relay 4 to be de-energized for three or four seconds and then again energizes that relay for another twenty-two second interval. Upon being again energized, a dial tone is received from phone line #1 which is transmitted by the audio transformer to phone line #2. If the telephone to which calls are to be forwarded did not answer the ring or that phone was busy on the first try, the call forwarding instructions can again be transmitted from phone line #2 via phone line #1 to the central office and receipt of the two beep tone signals then indicates that call forwarding has been established. If the two beep signals are not received, the procedure can be repeated in the next twenty-two second interval of the repeat timer. During the entire period of the long cycle timer, the repeat timer continually alternates between a 22 second on state and a 3 or 4 second off state.

Figure 2:
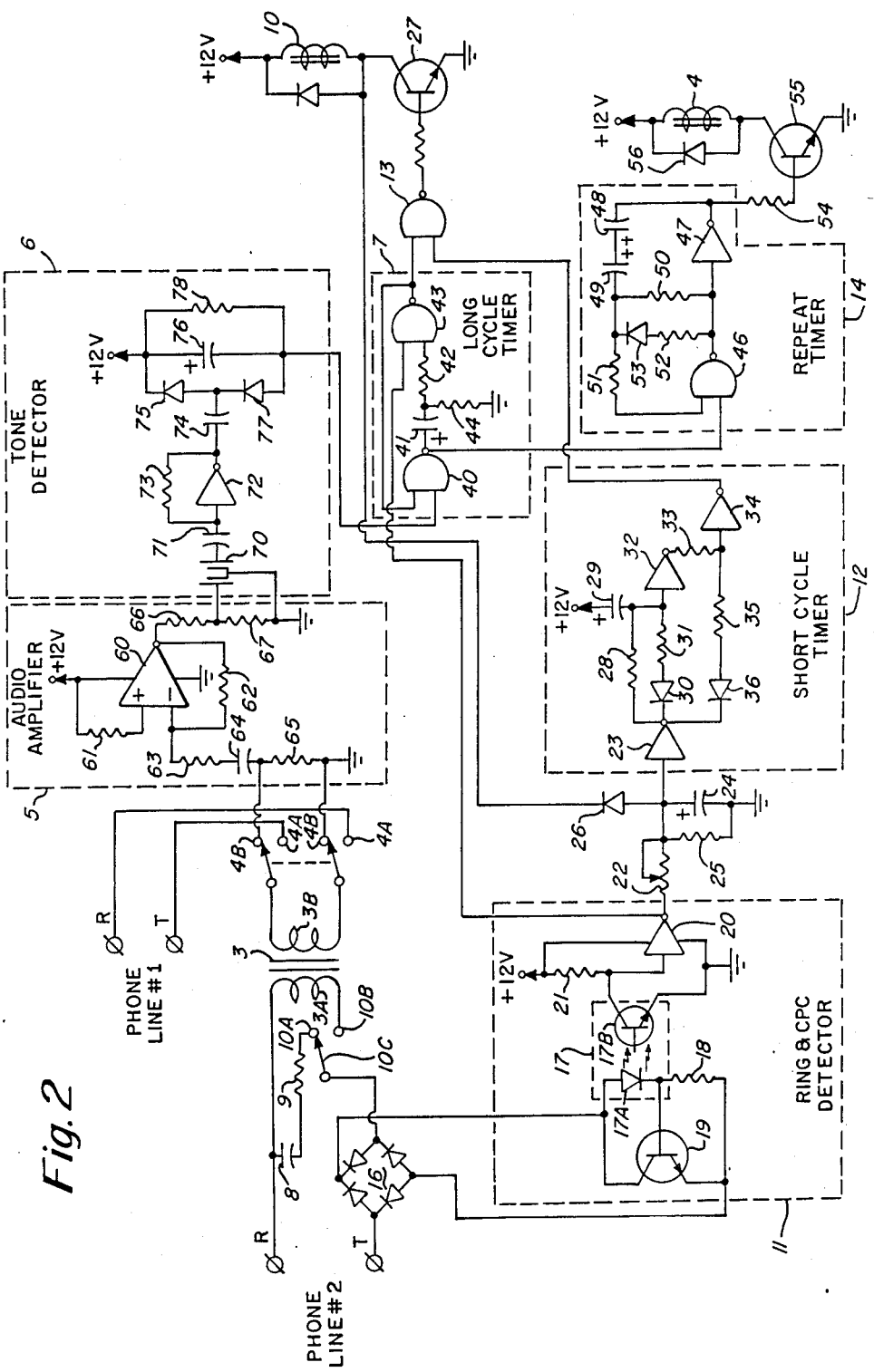

Referring now to the circuit diagram of FIG. 2, terminal R of phone line #2 is connected by capacitor 8 and series resistor 9 to contact 10A of relay 10. The other contact 10B of that relay is connected through winding 3A of audio transformer 3 to terminal R. The armature 10C of relay 10 is connected to a diode bridge 16 which is connected to terminal T of phone line #2.

RING AND CPC DETECTOR

A light emitting diode 17A in series with a resistor 18 are connected across the diode bridge. A transistor 19 is arranged to shunt current around the light emitting diode to protect that diode from damage. To achieve that end, the signal developed across resistor 18 is applied to the base-emitter junction of the transistor. Light emitting diode 17A is part of an opto-coupler 17 having a transistor element 17B which is sensitive to the light emitted by a diode. The resistance of element 17B is high when not illuminated and drops to a low value when illuminated by the light from diode 17A.

An inverting amplifier 20 has its input connected through resistor 21 to an electrical power source which supplies a positive voltage, here indicated to be +12 volts. The inverting amplifier can be part of an integrated circuit device such as a 74C04 unit which contains six inverting amplifiers. Such a device has a common ground pin and a common Vcc pin for all six inverting amplifiers while providing separate input and output pins for each amplifier.

The input of amplifier 20 is connected to ground by element 17B of the opto-coupler. The output of amplifier 20 is connected through resistor 22 to the input of inverting amplifier 23 which is part of short cycle timer 12. The input of amplifier 23 is shunted to ground by capacitor 24 which is in parallel with resistor 25. The upper end of capacitor 24, as viewed in FIG. 2, is connected through a diode 26 to the collector of transistor 27. Inasmuch as the emitter of that transistor is grounded, capacitor 24 discharges rapidly upon transistor 27 being triggered into conduction.

A ring signal applied to phone line #2 is rectified by diode bridge 16 and causes diode 17A to emit light. The resistance of element 17B of the opto-coupler thereupon drops to a low value, causing the output of inverter amplifier 20 to swing high and charge capacitor 24 through resistor 22. In between ring signals, capacitor 24 slowly discharges through resistor 25.

Noise pulses on the telephone line are usually of too short duration to charge capacitor 24 to a level that will cause false triggering of the apparatus. The ring signal, however, causes an appreciable charge to flow into capacitor 24. The resistor 22, preferably, is adjustable so that the device can be made to respond after the first, second, third, fourth, or fifth ring, as desired, by controlling the rate at which capacitor 24 charges through the resistor 22. If a call on phone line #2 is answered before the set number of rings, capacitor 24 is then prevented from charging to the required level to trigger the device and the device remains inactive.

SHORT CYCLE TIMER

A suitable circuit for the short cycle timer is shown in FIG. 2 in block 12. The output of amplifier 23 is connected through resistor 28 and capacitor 29 to a +12 volt electrical power source. Resistor 28 is shunted by series connected diode 30 and resistor 31. The input to inverter amplifier 32 is connected to the lower end of capacitor 29 as viewed in FIG. 2. The output of inverter amplifier 32 is connected thru resistor 33 to the input of inverter amplifier 34 whose output is connected as an input to NAND gate 13. The input of amplifier 34 is also connected through resistor 35 and diode 36 to the output of amplifier 23.

In the stand-by condition of the apparatus in which it is ready to respond to a phone call on phone line #2, capacitor 24 is discharged so that the output of inverter amplifier, is high. The input of inverter amplifier 32, therefore, is high and its output is low, causing diode 36 to be back biased. The low signal impressed on the input of inverter amplifier 34 causes that amplifier's output to be high. Consequently, the timer emits a high signal to NAND gate 13. In the stand-by condition, long cycle timer 7 also emits a high signal to NAND gate 13, causing the output of the NAND gate to be low. The low output of the NAND gate holds transistor 27 in its non-conductive state which prevents current from flowing through the coil of relay 10.

When the charge in capacitor 24 builds up to a sufficient level, the output of inverter amplifier 23 swings low, causing capacitor 29 to rapidly discharge through resistor 31 and diode 30. The input to amplifier 32 goes low, causing its output to go high and apply a high signal to the input of inverter amplifier 34. The output of amplifier 34 thereupon emits a low signal to NAND gate 13. That gate then emits a high signal to the base of transistor 27 which causes that transistor to become highly conductive. Upon that transistor becoming conductive, a current flows through the coil of relay 10 causing its armature 10C to move from contact 10A to contact 10B, thereby connecting the winding 3A of the audio transformer across phone line #2. That phone line is, by that action, seized.

When transistor 27 turns on, capacitor 24 rapidly discharges through diode 26 and transistor 27. The discharge of capacitor 24 causes the output of inverter amplifier 23 to swing high whereupon both diode 30 and diode 36 become back biased and capacitor 29 commences to charge through resistor 28. After a charging period of approximately 15 seconds, the output of inverter amplifier 32 swings low, causing the output of inverter amplifier to go high. The short cycle timer is therefore restored to its original stand-by state in which it emits a high signal to NAND gate 13. However, so long as transistor 27 is in its conductive state, the short cycle timer cannot be retriggered because current flowing toward capacitor 24 is diverted away through diode 26 so that an appreciable charge cannot build up in capacitor 24.

LONG CYCLE TIMER

Shown within block 7 of FIG. 2 is an arrangement suitable for the long cycle timer. In that arrangement, a NAND gate 40 has its output connected through a capacitor 41 and resistor 42 to an input of another NAND gate 43 whose output is fed back as an input to NAND gate 40. The other input to NAND gate 40 is provided by the tone detector, indicated as block 6 in FIG. 2. The other input to NAND gate 43 is provided by the output of inverter amplifier 20 in the ring and CPC detector 11. Capacitor 41 at the output of NAND gate 40 is connected to ground by resistor 44. NAND gate 43 furnishes an input signal to NAND gate 13.

In the stand-by condition of the apparatus, tone detector 6 emits a high signal to NAND gate 40. The other input of NAND gate 40 is also high as a consequence of the high signal fed back from the output of NAND gate 43. Inasmuch as both inputs of NAND gate 40 are high, the output of that gate is low. Both inputs of NAND gate 43 are low and that gate 43, therefore, emits a high signal to NAND gate 13.

When the high signal from the tone detector changes to low, the long cycle timer begins its timing cycle. The change of the high signal to a low at the input of NAND gate 40 causes the output of that gate to go high. Thereupon capacitor 41 commences to charge through resistor 44 and holds the input to NAND gate 43 high so long as capacitor 41 continues to charge. Assuming that an incoming telephone call was made over phone line #2, that phone line #2 was seized, that the appropriate tone signal was received by the tone detector, and that the tone detector thereupon emitted the start signal to the long cycle timer, the output of inverter amplifier 20 went high when phone line #2 was seized and remained high during the 15 second cycle of timer 12. Therefore, before the tone detector emitted its start signal, inverter amplifier 20 changed its low signal to NAND gate 43 to a high input signal. With both inputs to NAND gate 43 high, the output of that gate goes low and remains low until capacitor 41 approaches a full charge. The low output signal from gate 43 causes NAND gate 13 to emit a high output signal to the base of transistor 27 which maintains that transistor in its conductive state. Consequently line seizure of phone line #2 is maintained during the entire cycle of the long cycle timer. After about 140 seconds, capacitor 41 ceases to draw an appreciable charge and the input to NAND gate 43 goes low. The output of that gate thereupon goes high, returning the timer to its stand-by condition. When the output of NAND gate 43 goes high, the output of NAND gate 13 goes low, causing transistor 27 to become non-conductive and cutting off current flow to the coil of relay 10. Upon deenergization of that relay, its armature swings back to contact 10A, releasing phone line #2.

CALLING PARTY CONTROL

In those telephone systems where hanging up of the phone by the calling party causes an interruption of the telephone line current to the called phone, the calling party can cut short the 140 second cycle of the long cycle timer by hanging up the telephone. Referring to the arrangement shown within block 11 in FIG. 2, when phone line #2 is seized by the closure of armature 10C upon contact 10B which establishes a DC path across that phone line, the DC telephone line voltage causes diode 17A to continually emit light to photosensitive element 17B. Therefore, inverter amplifier 20 continually emits a high signal to the input of NAND gate 43 in the long cycle timer. Upon the calling party hanging up the phone, the DC telephone line current is interrupted. In the interval of that interruption, diode 17A ceases to emit light. Element 17B thereupon becomes a high resistance, causing the output of inverter amplifier to go low. That low signal is applied to the input of NAND gate 43, causing the output of that gate to go high. Assuming short cycle timer 12 has completed its cycle and is emitting a high signal to NAND gate 13, the change of the output signal of NAND gate 43 from low to high causes the output of NAND gate 13 to go low and turn off transistor 27. Thereupon, phone line #2 is released and the apparatus returns to its stand-by condition.

REPEAT TIMER

An arrangement suitable for the repeat timer is schematically shown in block 14 of FIG. 2. The function of the repeat timer is to seize procured service phone line #1 for a period of about 22 seconds, release that line for a short period of 3 or 4 seconds, and repeat that action during the entire period of the long cycle timer. That sequence of repeat timer operation enables call forwarding instructions given from phone line #2 to be reentered, corrected, changed, or cancelled in the subsequent 22 second repetitive periods without requiring another phone call to be made over phone line #2.

The repeat timer employs a NAND gate 46 whose output is connected to the input of an inverting amplifier 47. The output of the inverting amplifier is coupled back to its input by capacitors 48 and 49 which are in series with resistor 50. Those capacitors are also connected through resistor 51 to one input of NAND gate 46. Connected in parallel with resistor 50 are resistor 52 and diode 53. The output of inverting amplifier 47 is connected by resistor 54 to the base of a transistor 55 which controls the flow of current through the coil of relay 4. To protect that coil from damage upon sudden collapse of its magnetic field, the coil is shunted by diode 56. As shown in FIG. 2, the upper end of the relay coil is connected to an electrical power source here indicated to provide +12 volts.

In the stand-by condition of the apparatus, the long cycle timer 7 emits a low signal to one input of NAND gate 46. The other input of gate 46 is held high by the feedback from the output of the gate through resistor 52, diode 53, and resistor 51. The high signal emitted by gate 46 to the input of inverter amplifier 47 causes the output of that amplifier to be low. Consequently, transistor 55 is cut off and prevents current flow through the coil of relay 4. Capacitors 48 and 49 are fully charged through resistor 52 and diode 53 to the difference in potential between the high input and low output of inverter amplifier 47.

Upon the long cycle timer 7 emitting a high signal to the input of NAND gate 46, the output of that gate goes low, causing the output of inverter amplifier 47 to go high. Thereupon, transistor 55 becomes conductive and permits the coil of relay 4 to be energized by a flow of current. The energized relay causes its armature to move from contacts 4B to the contacts 4A which connect audio transformer winding 3B to phone line #1, whereupon that line is seized. Call forwarding instructions can then be transmitted over phone line #2 and phone line #1 to the central station.

Capacitors 48 and 49 discharge through resistor 50 until the input to NAND gate 46 becomes low. The discharge period is preferably about 22 seconds although that period is not critical so long as it is sufficient to permit call forwarding instructions to be transmitted to the central station and the phone to be answered at the designated number. At the end of that period, the output of NAND gate 46 changes from low to high, causing the output of the inverter amplifier to go low and cut off current flow through transistor 55. De-energization of relay 4 causes procured service phone line #1 to be released. Capacitors 48 and 49 charge up in 3 or 4 seconds through resistor 52 and diode 53 and cause the input to NAND gate 46 to go high. Thereupon the repeat timer again seizes phone line #1 and the cycle is repeated so long as the long cycle timer emits a high signal to the input of NAND gate 46.

THE AUDIO AMPLIFIER

The circuit shown within block 5 of FIG. 2 is a conventional audio amplifier circuit employing an LM3900 integrated circuit. The amplifier 60 has its positive input connected through resistor 61 to a +12 volt source of electrical power. The output of the amplifier is fed back to its inverting input through resistor 62. The inverting input of amplifier 60 is coupled to ground by resistor 63, capacitor 64 and resistor 65. The input signal from transformer winding 3B is applied across resistor 65. The output of amplifier 60 is connected to ground by the voltage divider formed by resistor 66 and resistor 67. The input to the tone detector is taken across resistor 67.

When phone line #2 is first seized by the short cycle timer, audio signals transmitted over phone line #2 are coupled by transformer 3 to the input of amplifier 5 and the amplified audio signals appear at the output of that device. Upon a tone signal of the proper frequency being received, the tone detector emits a signal to the long cycle timer that results in energization of relay 4. Upon being energized, relay 4 disconnects the input of amplifier 5 from the audio transformer and connects winding 3B of that transformer to phone line #1.

Audio amplifier 5 and tone detector 6 are, in effect, a security arrangement that permits only those who transmit the proper identifying tone signal to give call forwarding instructions over phone line #1.

THE TONE DETECTOR

A suitable tone detector circuit is shown within block 6 of FIG. 2. That circuit employes a mechanical filter 70, such as a tuning fork or vibrating reed, which permits signals from amplifier 6 to pass that are within a very narrow frequency band. That pass band can be only one or two cycles wide. Filter 70 is coupled by capacitor 71 to the input of an inverting amplifier 72 which has its output coupled to its input by a feedback resister 73. The output of amplifier 72 is coupled by capacitor 74 and diode 75 to a +12 volt electrical power source. That +12 volt electrical power source is connected by capacitor 76 and diode 77 to capacitor 74. A resistor 78 shunts capacitor 76. The lower end of capacitor 76, as viewed in FIG. 2, is connected to an input of NAND gate 40 in the long cycle timer.

In the absence of a tone signal that can pass filter 70, the signal at the lower end of capacitor 76 is high. Upon reception of a tone signal of the proper frequency to pass filter 70, capacitor 76 alternately discharges rapidly through diode 77 and charges slowly through resistor 78. Consequently, the signal at the lower end of capacitor 76 drops from high to low and remains low so long as the proper tone signal is received. The drop to a low signal starts the timing cycle of the long cycle timer. Thereupon the repeat timer is triggered and causes procured service phone line #1 to be seized, enabling call forwarding instructions to be transmitted to the central station.

OTHER EMBODIMENTS

It is apparent from the foregoing exposition of the preferred embodiment that the invention can be embodied in other forms. For example, the tone detector can be replaced by an authorization detector of the kind that responds to a preestablished sequence of pulses. The CPC detector which detects hang-up of the calling party's phone can be made to respond to a dial tone instead of or in addition to detecting interruption of the telephone line current. Different kinds of long cycle and short cycle timers may be employed. The relays can be electronic devices rather than electro-mechanical devices. Other logic arrangements can be used for the gates in place of the logic employed in the preferred embodiment.

In view of the different forms in which the invention can be embodied, it is intended that the invention not be limited to the precise embodiment described herein. It is, rather, intended that the scope of the invention be construed in accordance with the appended claims, having regard for the substitution of equivalents which are obvious to those skilled in the telephone and electronic arts.

I claim:

1. Telephone call forwarding apparatus for enabling call forwarding instructions to be given over a subscriber's procured service telephone line from a second telephone line, the apparatus comprising,
    (a) line seizure means for seizing the second telephone line,
    (b) ring signal detector means responsive to ring signals on the second telephone line for causing the line seizure means to seize the second telephone line,
    (c) switch means responsive to the ring signal detector means for coupling audio signals between the second telephone line and the subscriber's procured service phone line,
    (d) a long cycle timer for continuously maintaining seizure of the second telephone line for the period of the long cycle, and
    (e) repeat timer means for automatically and repetitively, during the long cycle period, causing the switch means alternatingly to seize the procured service phone line for an interval in which call forwarding instructions can be given and to release the procured service phone line for a second interval whose duration enables a new dial tone to be subsequently obtained on the procured service phone line.

2. The apparatus according to claim 1, further comprising
    (e) authorization signal detector means responsive to an authorization signal from the second telephone line, the authorization signal detector means causing activation of the long cycle timer upon detection of an authorization signal.

3. Telephone call forwarding apparatus for enabling call forwarding instructions to be given over the subscriber's procured service telephone line from a second telephone line comprising,
    (a) line seizure means for seizing the second telephone line,
    (b) a ring signal detector for detecting ring signals on the second telephone line,
    (c) an audio signal transmitter,
    (d) switch means for coupling audio signals from the seized second telephone line either to the audio signal transmitter or to the subscriber's procured services phone line,
        the switch means in its initial state coupling the seized second telephone line to the audio signal transmitter,
    (e) a short cycle timer responsive to a start signal from the ring signal detector, the short cycle timer responding to a start signal from the ring signal detector by causing the second telephone line to be seized for the period of the short cycle,
    (f) an authorization signal detector receiving its input from the audio signal transmitter, the authorization signal detector responding to an authorization signal by emitting a start signal,
    (g) a long cycle timer responsive to a start signal from the authorization signal detector, the long cycle timer causing the line seizure means to maintain seizure of the second phone line for the period of the long cycle, and
    (h) a repeat timer adapted to be activated for the long cycle period by the long cycle timer, the repeat timer controlling the switch means that couples audio signals to the subscriber's procured service phone line, the repeat timer repetitively causing the switch means alternatingly to seize the subscriber's procured service phone line for an interval in which call forwarding instructions can be given and to release the subscriber's procured service phone line for an interval enabling a new dial tone to be subsequently obtained.

4. The apparatus according to claim 3, further comprising
    hang-up detection means responsive to hang-up of the second telephone line for initiating release by the line seizure means of the seized second telephone line.

5. The apparatus according to claim 3, wherein
    the authorization signal detector includes a tone detector responsive to a predetermined tone, the authorization signal detector emitting its start signal upon detection of the predetermined tone.

6. The apparatus according to claim 3 wherein
    the audio signal transmitter includes means for amplifying the transmitted audio signal.

* * * * *